Aug. 28, 1951  G. B. LITCHFORD  2,565,506
OMNIDIRECTIONAL RADIO RANGE SYSTEM
Filed July 26, 1949  2 Sheets-Sheet 1
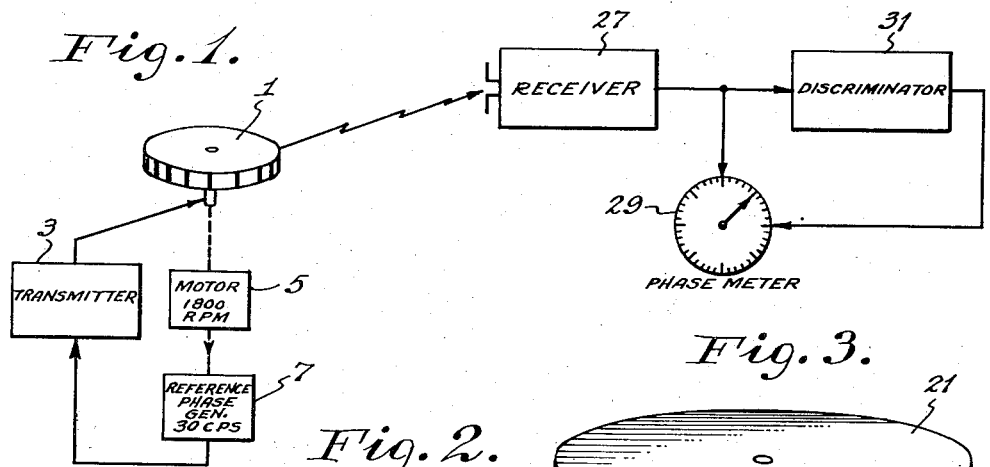
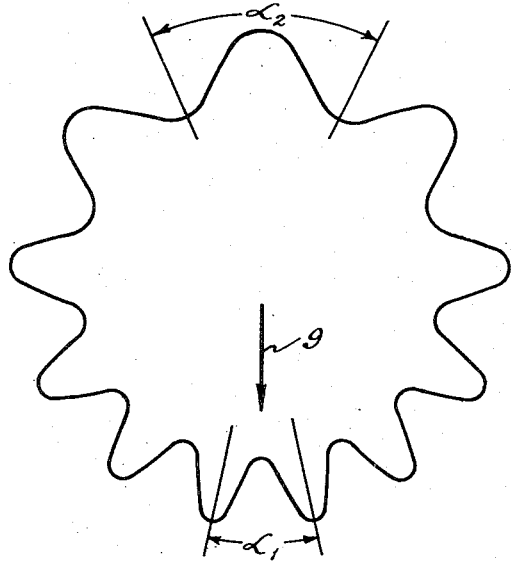
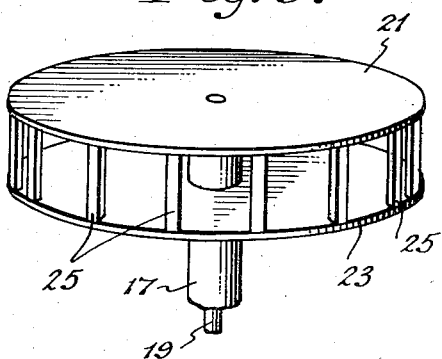
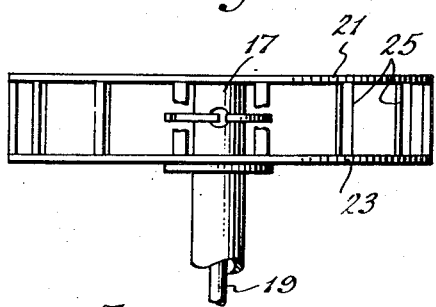
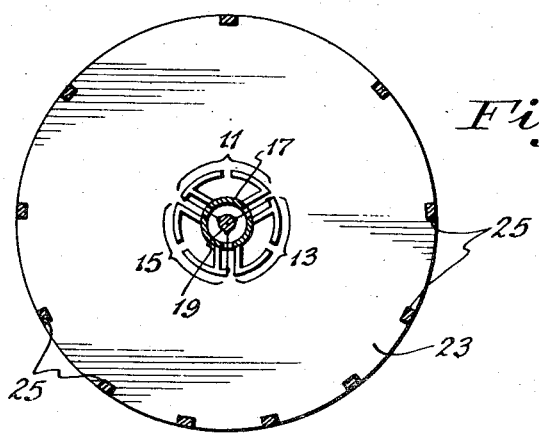
INVENTOR
GEORGE B. LITCHFORD
BY
ATTORNEY

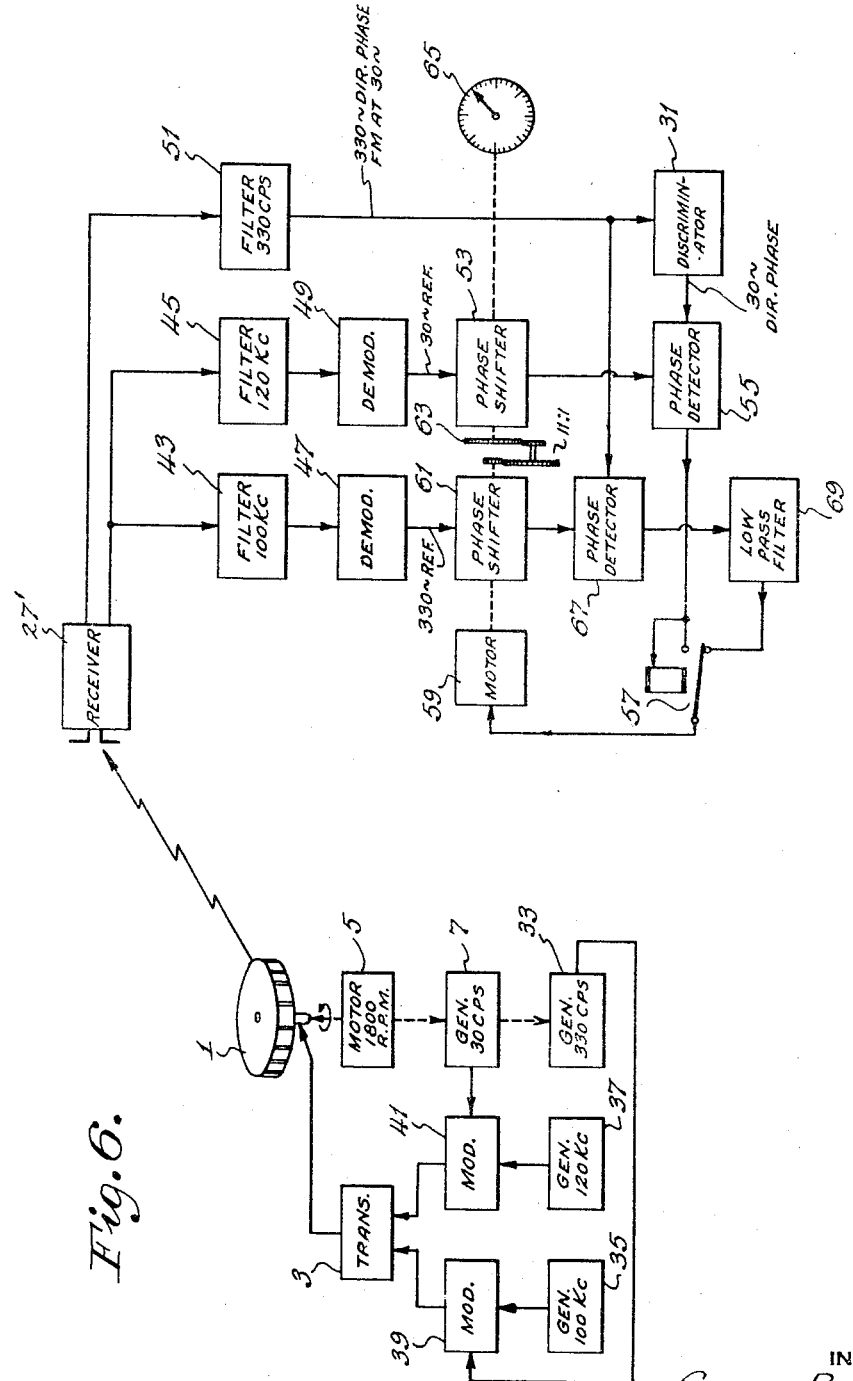

Patented Aug. 28, 1951

2,565,506

UNITED STATES PATENT OFFICE 2,565,506

OMNIDIRECTIONAL RADIO RANGE SYSTEM

George B. Litchford, Huntington, N. Y., assignor to The Sperry Corporation, a corporation of Delaware Application July 26, 1949, Serial No. 106,933

16 Claims. (Cl. 343—106)

This invention relates to improvements in omnidirectional radio range systems wherein signals are radiated in a rotating directive pattern from a reference location, and received at any point whose direction from said reference location is to be determined. The transmitted signals are modulated with a reference signal synchornized with the pattern rotation. Owing to the rotation of the directive pattern, the signals received at any direction from the reference station are further modulated; the phase of this pattern-rotation modulation depends upon the direction and is measured with respect to that of the reference signal to determine the direction.

One of the principal objects of the present invention is to provide omnidirectional ranges of the above described type wherein the pattern-rotation modulation is in the form of a subcarrier which is modulated at the pattern rotation frequency.

Another object is to provide high precision omnidirectional range systems including fine and coarse channels, the coarse directional phase signag being impressed as modulation upon the fine directional phase signal.

A further object of the present invention is to provide omnidirectional range beacons for transmitting signals which can be utilized by relatively simple range receiver equipment to obtain indications with an accuracy of the order of two or three degrees, and utilized with somewhat more elaborate receiver equipment to give indications having an accuracy of the order of tenths of a degree.

The invention will be described with reference to the accompanying drawings, wherein:

Fig. 1 is a schematic block diagram of an omnidirectional radio range system embodying the invention.

Fig. 2 is a polar graph of a suitable directive pattern for the transmitting antenna in Fig. 1.

Figs. 3, 4 and 5 are oblique, elevational and sectional views, respectively, of an antenna for producing the pattern of Fig. 2, and Fig. 6 is a schematic block diagram of a system which includes cooperating fine and coarse channels, the fine directional phase signal acting as a frequency modulated subcarrier for the coarse directional phase signal.

Reference is made here to copending application Serial No. 782,722 filed October 29, 1947 by George B. Litchford and Joseph Lyman, and entitled Omni-Azimuth Guidance System. Said copending application describes and claims omnidirectional radio ranges having fine and coarse channels, the rotating directive pattern having the form of a scalloped limacon. The basic limacon pattern has superimposed upon it an integral number (for example eleven) evenly spaced lobes. The pattern-rotation modulation thus includes two harmonically related frequencies, one equal to the pattern rotation frequency and the other the eleventh harmonic thereof. These components are the coarse and fine directional phase signals respectively.

The present system differs from that of the above mentioned copending application in that the coarse directional phase signal appears as modulation (preferably frequency or phase modulation) upon the fine directional phase signal, rather than simply as an additional and independent modulation of the received radio frequency carrier. This arrangement has certain advantages, among which are that the equipment at the mobile receiving station may be somewhat simpler, and amplitude limiting may be used to discriminate against some types of interferences. Also, the principles of the invention may be applied to a single channel system, with the directional phase signal appearing as modulation upon a subcarrier which itself is produced by rotation of the directive pattern.

Referring to Fig. 1, which illustrates a single-channel system, the reference station includes a rotatable directive antenna 1 and a radio transmitter 3 connected to the antenna. A motor 5 is arranged to rotate the antenna 1 continuously at a speed of for example, 1800 R. P. M. The motor 5 also drives an alternator 7 in synchronism with the antenna 1. The alternator 7 is connected to the transmitter 3 to modulate its radio frequency output.

The antenna 1 may have a horizontal or azimuthal directive pattern like that shown in Fig. 2, comprising a plurality (eleven, in the present case) of lobes or scallops. The angular spacing between corresponding points on adjacent lobes varies from a minimum value of $a_1$ in the direction of the arrow 9 to a maximum value $a_2$ in the opposite direction. All of the lobes may have substantially equal amplitudes, and the spacing between them may vary smoothly in a sinusoidal manner.

The pattern of Fig. 2 may be produced by a substantially omni-directional central radiator surrounded by a phase-front modifying structure, as shown in Figs. 4, 5 and 6. The central radiator in the present example comprises three arcuate dipoles 11, 13 and 15, each having one arcuate arm connected to the outer sheath 17 of a coaxial feed line and the other arm connected to the inner conductor 19 of the feed line. These arcuate dipoles each occupy a 120° sector about the vertical axis of the system, at a radius of approximately one-quarter wavelength.

The omnidirectional radiator is positioned at the center of a drum comprising upper and lower conductive discs 21 and 23, which cooperate as a radial wave guide for conveying energy from the central radiator to the peripheral aperture. Vertical columns or staves 25 are provided for altering the phase front of the substantially uniform pattern of the central radiator to provide the lobes as shown in Fig. 2. The angular spacing between adjacent staves may vary as shown to produce corresponding variations in the lobe spacings. Alternatively, the staves 25 may be equally spaced, and the radiator system disposed eccentrically within the drum 21, 23.

Returning to Fig. 1, the mobile or receiver station includes a receiver 27 tuned to the frequency of the reference station transmitter 3. The output circuit of the receiver is coupled to one of the two input circuits of a phase meter 29, and also to the input circuit of a frequency discriminator 31. The discriminator may be of any of the several known types, and is designed for a center frequency of 330 cycles per second, with an operating band of, for example ±20%, i. e. approximately 260 cycles per second to 400 cycles per second. The output circuit of the discriminator is connected to the second input circuit of the phase meter 29.

The phase meter 29 may be a simple indicator of the type used in electric power plants, a cathode ray oscilloscope connected to indicate phase, or a phase responsive servo system. In any event, it is designed to measure the phase difference between two 30 cycle input voltages, and may include filters or equivalent means for rejecting input signal components of other frequencies.

In the operation of the system of Fig. 1, the transmitter 3 produces a carrier of, say 5,000 megacycles per second, which is modulated by the generator 7 at 30 cycles per second. The modulation may be of simple amplitude variation or it may be any other known type of modulation which can be detected and reproduced by the receiver 27. For the purpose of the present explanation, it is assumed that amplitude modulation is used and that the receiver 27 includes an amplitude modulation detector.

Owing to rotation of the antenna 1 by the motor 5 at 1800 R. P. M., i. e. 30 cycles per second, the amplitude of the signal received at the receiver 27 also varies at an average frequency of 330 cycles per second, because there are 11 lobes in the directive pattern. However, since the spacing between lobes varies as shown in Fig. 2, this pattern-rotation modulation varies cyclically in frequency, 30 times per second. Thus, the output of the receiver 27 includes, in addition to the 30 cycle reference signal derived from the generator 7, a 330 cycle subcarrier which is frequency modulated at 30 cycles.

The discriminator 31 is unaffected by the 30 cycle reference signal, but responds to the 330 cycle frequency modulated signal to produce a 30 cycle output. The positive-going peak of the discriminator output wave occurs when the frequency is highest, i. e. each time the antenna 1 is oriented so that the part of its pattern when the lobes are closest lies in the direction of the mobile station. The reference phase generator 7 is synchronized with the antenna rotation so that its positive peaks occur when the closest-spaced part of the radiation pattern points in some reference direction, such as North. Thus, the phase difference between the 30 cycle output of the discriminator and the 30 cycle reference phase signal corresponds to the direction of the mobile station from the reference station. This phase difference is indicated by the phase meter 29, which may be calibrated in degrees.

The 30 cycle discriminator output may be referred to as a "directional phase" signal, since its phase varies with direction from the reference station. Some consideration will show that the 330 cycle subcarrier is also a directional phase signal, going through a phase change of 360 degrees with each $$\frac{360}{11}$$

or 32.72 degree change in azimuth. This signal may be utilized to obtain a fine azimuth indication, to an accuracy of about 10% of that of the phase meter 29, by providing a 330 cycle reference generator at the reference station and a 330 cycle phase meter at the mobile station. Although separate fine and coarse indicators may be used, it is preferred at present to combine the coarse and fine phase measurements in a single azimuth indication, as in the system of Fig. 6.

The two channel system of Fig. 6 includes an antenna 1, a transmitter 3, motor 5, and reference phase generator 7 substantially like the correspondingly designated elements of Fig. 1. A second reference phase generator 33 is coupled to the motor 5 to provide an output of frequency $nf$, where $n$ is the number of lobes in the pattern and $f$ is the pattern rotation frequency. It is assumed for the purpose of explanation that $n=11$ and $f=30$, so the frequency of the generator 33 is 330 cycles per second.

Two subcarrier generators 35 and 37, operating at different frequencies such as 100 kc. and 120 kc. respectively, are connected to modulators 39 and 41 which are controlled by the respective outputs of the reference phase generators 33 and 7.

The term "modulator" is used to mean any known device which accepts two input signals and provides an output signal in which one of the input signals is modulated by the other, in frequency or in amplitude, for example. The modulated subcarriers are applied to the transmitter 3 to modulate its carrier, in amplitude or in frequency, and the transmitter output is radiated by the antenna 1.

The mobile station in Fig. 6 includes a receiver 27' similar to the receiver 27 of Fig. 1 but including whatever additional detector means is necessary to reproduce the modulated subcarriers produced by the modulators 39 and 41. For example, if the transmitter 3 is frequency modulated by the modulators 39 and 41, it is evident that the receiver 27' must have a frequency modulation detector besides the amplitude modulation detector which is required to respond to the cyclical variation in field strength caused by rotation of the directive pattern. If the transmitter 3 is amplitude modulated, a single amplitude modulation detector in the receiver 27' will suffice.

The reproduced 100 kc. and 120 kc. signals are applied to filters 43 and 45, whose separated outputs go to demodulators 47 and 49 respectively. The demodulators 47 and 49 reproduce the 330 cycle and the 30 cycle reference phase signals originating at the generators 33 and 7 respectively. A band pass filter 51, designed for a center frequency of 330 cycles per second and a pass band of say ±20%, is connected between the receiver 27' and the discriminator 31. As a practical matter, the filter 51 may be a part of the discriminator 31, although it is shown separately. The discriminator 31 is similar in design and function to the discriminator 31 in Fig. 1.

The 30 cycle reference phase output of the demodulator 49 goes through a variable phase shifter 53 to a phase detector 55. The 30 cycle directional phase signal output of the discriminator 31 is also applied to the phase detector 55, which produces a direct current output whose magnitude and polarity depend upon the phase relationship between the phase-shifted reference signal and the directional signal. The output of the phase detector 55 goes to one contact and to the actuating coil of a relay 57, the connections being such that whenever the phase detector output is above a certain magnitude, the relay operates to apply it to a motor 59.

The motor 59 is reversible, and its direction of rotation depends upon the polarity of the phase detector output which energizes it. The shaft of the motor 59 is coupled to a second variable phase shifter 61, and through gears 63 to the phase shifter 53 and to a dial and pointer 65 or equivalent arrangement, which is calibrated in terms of azimuth.

The second phase shifter 61 is connected between the demodulator 47 and a second phase detector 67. The phase detector 67 is also supplied with the 330 cycle frequency modulated directional phase signal from the filter 51. The phase detector 67 may be similar to the phase detector 55, and will operate in the same way except that its output will include a 30 cycle ripple superimposed on the direct current component. The D. C. portion will depend in magnitude and polarity upon the phase relationship between the 330 cycle directional phase signal (i. e. the 330 cycle subcarrier) and the phase-shifted 330 cycle reference signal. The 30 cycle ripple results from the frequency modulation of the 330 cycle directional phase signal.

A low pass filter 69 is provided to remove the 30 cycle component from the output of the phase detector 67. The remaining D. C. component is supplied to the lower contact of the relay 57, so that when the relay is deenergized, the motor 59 is operated by the output of the phase detector 67.

In the operation of the system of Fig. 6, the reference station radiates an ultra high frequency (e. g. 5000 megacycles) carrier modulated by 100 kilocycle and 120 kilocycle subcarriers, which in turn are modulated by the 330 cycle and 30 cycle phase reference signals respectively. As in the system of Fig. 1, the rotation of the multiple lobe radiation pattern superimposes a 330 cycle amplitude modulation on the carrier, the 330 cycle modulation being frequency modulated at 30 cycles per second.

At the mobile station, the 330 cycle and the 30 cycle reference phase signals are reproduced in the outputs of the demodulators 47 and 49 respectively. The 30 cycle directional phase signal appears at the output of the discriminator 31 and is compared, in the phase detector 55, with the phase-shifted 30 cycle reference signal.

Whenever the phase shift in the phase shifter 53 differs by more than, say ten degrees from that corresponding to the time direction of the mobile station from the reference station, the output of the phase detector 55 is sufficient to energize the relay 57. The motor 59 runs to drive the phase shifter 53 toward its correct position. The motor 59 also drives the 330 cycle phase shifter 61, at an angular rate (degrees phase shift per revolution of the motor) 11 times that of the phase shifter 53. However, the resulting variations in the output of the 330 cycle phase detector 67 do not have any effect upon the motor 59 until the correct position of the 30 cycle phase shifter 53 is approached.

As the phase shifter 53, and with it the azimuth indicator 65, is driven to within 10 degrees of the correct position, the relay 57 operates to transfer control of the motor 59 to the 330 cycle phase detector 67. The motor 59 then runs to adjust the phase shifter 61 to substantially the position which corresponds to the actual azimuth of the mobile station from the reference station. The relay 57 subsequently remains in its lower position, connecting the motor 59 to the "fine" 330 cycle channel, until and unless an error of more than 10 degrees is introduced, for example by momentary signal failure or by maneuvering of the mobile station.

Although the invention has been described in its presently preferred form, with frequency modulation of the fine directional phase signal by the coarse directional phase signal, it will be apparent that amplitude modulation may be used instead by proper design of the rotating antenna to produce lobes of varying intensity rather than of varying spacing. It is also pointed out that frequency modulation and phase modulation are indistinguishable, and are in fact identical where a single modulation frequency is involved, as in the present case.

Since many changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. In an omnidirectional radio range transmitter system, a directive antenna including a central radiator and a plurality of phase front modifying devices surrounding said radiator with different angular spacings to provide a field pattern comprising a plurality of dissimilar lobes, means for rotating said field pattern substantially continuously, a transmitter connected to said antenna, a source of constant phase reference signal, and means for modulating said transmitter with said reference phase signal.

2. In an omnidirectional radio range transmitter system, a directive antenna including a central radiator and a plurality of phase front modifying devices surrounding said radiator with different angular spacings to provide a field pattern comprising a plurality of unequally spaced lobes, means for rotating said antenna at a substantially constant speed, a transmitter connected to said antenna, a source of constant phase reference signal, and means for modulating said transmitter with said reference phase signal.

3. An omnidirectional radio range system including a central radiator and a plurality of wave obstructions rotatable about said radiator at substantially uniform radius and with different angular spacings for radiating energy in a rotating directive pattern which comprises a plurality of dissimilar lobes, whereby a directionally modulated field is produced, the modulation of said field consisting of a subcarrier component which is in turn modulated at the frequency of rotation of said pattern, the phase of said modulation varying in accordance with direction, and further means for modulating said energy with a constant phase reference signal.

4. In an omnidirectional radio range system, a reference station including a transmitter, a radiator connected to said transmitter, and a plurality of phase front modifying elements surrounding said radiator at different angular spacings and rotatable about said radiator for radiating the output of said transmitter in a rotating directive pattern comprising a plurality of dissimilar lobes whereby the field around said reference station is modulated by a subcarrier which in turn is modulated in a phase characteristic of the direction from said reference station.

5. An omnidirectional radio range receiver system, including receiver means adapted to respond to a directionally modulated radiation field to provide an output including a constant-phase component and another component which is frequency modulated; discriminator means connected directly to said receiver responsive to said frequency modulated component to produce a constant frequency variable phase signal, and means for indicating the phase relationship between said last mentioned signal and said constant-phase component.

6. An omnidirectional radio range receiver system, including receiver means adapted to respond to a directionally modulated radiation field to provide an output including two harmonically related constant-phase components and another component which is frequency modulated; discriminator means responsive to said frequency modulated component to produce a constant frequency variable phase signal, direction indicator means, and means responsive to the phase relationship between said signal and one of said constant-phase components to provide coarse positioning of said direction indicator; and further means responsive to the phase relationship between the carrier portion of said frequency modulated component and the other of said constant-phase components to provide fine positioning of said direction indicator.

7. An antenna for omnidirectional radio range systems, comprising a radiator having a substantially circular azimuthal directive pattern, a pair of conductive plates disposed respectively above and below said radiator to act as a radial wave guide, and a plurality of phase front modifying devices between said plates and surrounding said radiator, the angular spacings between said devices about said radiator varying according to their directions from said radiator.

8. An antenna for omnidirectional radio range systems, comprising a radiator having a uniform horizontal directive pattern, and a plurality of phase front modifying devices surrounding said radiator and in relationships thereto which vary according to their directions from said radiator.

9. An omnidirectional radio range system including a reference station and at least one mobile station, a transmitter at said reference station, a radiator connected to said transmitter, and a plurality of phase front modifying elements surrounding said radiator at different angular spacings and rotatable about said radiator for radiating the output of said transmitter in a rotating directive pattern comprising a plurality of unequally spaced lobes whereby the radiation field in each direction from said reference station is angle modulated in a phase characteristic of said direction, a reference phase generator and means for modulating said transmitter with the output thereof; receiver means at said mobile station responsive to said transmitted signal to reproduce said reference phase signal and to produce a variable phase signal corresponding to said angle modulation, and means responsive to the phase relationship between said two last mentioned signals to indicate the direction of said mobile station from said reference station.

10. An omnidirectional radio range system including a reference station and at least one mobile station, a transmitter at said reference station, a radiator connected to said transmitter, and a plurality of phase front modifying elements surrounding said radiator at different angular spacings and rotatable about said radiator for radiating the output of said transmitter in a rotating directive pattern comprising a plurality of dissimilar lobes whereby the field around said reference station is modulated with a subcarrier which in turn is modulated in a phase characteristic of the direction from said reference station, a reference phase generator and means for modulating said transmitter with the output thereof; receiver means at said mobile station responsive to said transmitted signal to produce said reference phase signal and to produce a variable phase signal corresponding to said modulation of said subcarrier, and means responsive to the phase relationship between said two last mentioned signals to indicate the direction of said mobile station from said reference station.

11. An omnidirectional radio range system including a reference station and at least one mobile station, a transmitter at said reference station, a radiator connected to said transmitter, and a plurality of phase front modifying elements surrounding said radiator at different angular spacings and rotatable about said radiator for radiating the output of said transmitter in a rotating directive pattern comprising a plurality of dissimilar spaced lobes whereby the field around said reference station is modulated at a first frequency, substantially higher than that of said pattern rotation, said first frequency being modulated at a second frequency equal to that of said pattern rotation and in a phase characteristic of the direction from said reference station, a reference phase generator and means for modulating said transmitter with the output thereof; receiver means at said mobile station responsive to said transmitted signal to produce said reference phase signal and to produce a variable phase signal corresponding to said second directionally characteristic modulation, and means responsive to the phase relationship between said two last mentioned signals to indicate the direction of said mobile station from said reference station.

12. An omnidirectional radio range system including a reference transmitting station and at least one mobile receiving station, said reference station comprising a transmitter, a radiator connected to said transmitter, and a plurality of phase front modifying elements surrounding said radiator at different angular spacings and rotatable about said radiator for radiating energy in a rotating field pattern, said field pattern having a plurality of unequally spaced lobes, a reference phase generator synchronized with the rotation of said directive pattern and providing a constant phase output of a frequency equal to the rotation frequency of said pattern, and means for modulating said transmitter with the output of said reference phase generator; means at said mobile receiver station for reproducing the output of said reference phase generator, means responsive to said rotating field to produce a signal varying in frequency at a rate corresponding to the frequency of said reference phase generator, means responsive to said variable frequency signal to provide an output of a frequency equal to that of said reproduced reference phase signal but displaced in phase with respect thereto in accordance with the direction of said mobile station from said reference station, and means responsive to said last mentioned signal and to said reproduced reference phase signal to indicate said direction.

13. An omnidirectional radio range system including a reference transmitting station and at least one mobile receiving station, said reference station comprising a transmitter, antenna means connected to said transmitter and radiating the output thereof in a rotating field pattern, said field pattern having a plurality of unequally spaced lobes, a reference phase generator synchronized with the rotation of said directive pattern and providing a constant phase output of a frequency equal to the rotation frequency of said pattern, and means for modulating said transmitter with the output of said reference phase generator; means at said mobile receiver station responsive to said rotating field to produce a signal varying in frequency at a rate corresponding to the frequency of said reference phase generator, discriminator means responsive to said variable frequency signal to provide an output of a frequency corresponding to that of said reference phase generator but displaced in phase with respect thereto in accordance with the direction of said mobile station from said reference station, means for reproducing at said mobile station the output of said reference phase generator, phase detector means responsive to said discriminator output signal and to said reproduced reference phase signal to provide a control signal, and means responsive to said control signal to produce an indication of said direction.

14. An omnidirectional radio range system including a reference transmitting station and at least on mobile receiving station, said reference station comprising means for radiating energy in a rotating field pattern, said field pattern having a plurality of unequally spaced lobes, a low frequency reference phase generator synchronized with the rotation of said directive pattern and providing a constant phase output of a frefrequency equal to the rotation frequency of said pattern, a high frequency reference phase generator synchronized with said pattern rotation and producing a constant phase output of a frequency equal to the product of said rotation frequency and the number of said lobes, and means for modulating said transmitter with the respective outputs of said reference phase generators; means at said mobile receiver station for reproducing said reference phase signals, means responsive to said rotating field to produce a signal corresponding in frequency to said high frequency reference phase signal but varying in frequency at the frequency of said low frequency reference phase signal, means responsive to said varying frequency signal to provide an output of the frequency of said low frequency reference phase signal but displaced in phase with respect thereto in accordance with the direction of said mobile station from said reference station, phase detector means responsive to said last mentioned output signal and to said low frequency reference phase signal to provide a coarse control signal, further phase detector means responsive to said varying phase signal and to said high frequency reference phase signal to produce a fine control signal, and means responsive to said coarse and fine control signals to indicate said direction.

15. An omnidirectional radio range system including a reference transmitting station and at least one mobile receiving station, said reference station comprising a transmitter, antenna means connected to said transmitter and radiating the output thereof in a rotating field pattern, said field pattern having a plurality of unequally spaced lobes, a reference phase generator synchronized with the rotation of said directive pattern and providing a constant phase output of a frequency equal to the rotation frequency of said pattern, a further reference phase generator synchronized with said pattern rotation and producing a constant phase output of a frequency equal to the product of said rotation frequency and the number of said lobes, and means for modulating said transmitter with the respective outputs of said reference phase generators; means at said mobile receiver station responsive to said rotating field to produce a signal having an average frequency equal to the frequency of said second phase reference generator but varying in frequency at a rate corresponding to the frequency of said first reference phase generator, discriminator means responsive to said variable frequency signal to provide an output of a frequency corresponding to that of said first reference phase generator but displaced in phase with respect thereto in accordance with the direction of said mobile station from said reference station, means for reproducing at said mobile station the outputs of said reference phase generators, phase detector means responsive to said discriminator output signal and to said corresponding reference phase signal to provide a first control signal, further phase detector means responsive to said varying frequency signal and to said second reference phase output to produce a second control signal, a direction indicator, a motor for positioning said indicator, and means responsive to said first control signal for energizing said motor to effect coarse positioning of said indicator and for energizing said motor in response to said second control signal to effect fine positioning of said indicator.

16. A receiving apparatus for use in omni-directional radio bearing indicating system, comprising filter means for selecting coarse, fine and reference received signals carried by a common carrier, said coarse signal being in the form of a frequency modulation impressed on said fine signal, means for demodulating said signals, a direction indicator, phase responsive means controlled from the coarse signal demodulator for approximately controlling the position of said indicator, second phase responsive means controlled from said fine signal demodulator for accurately controlling the position of said indicator, and switch means responsive to the amplitude of the output of said first phase responsive means to transfer the control of said indicator from said coarse signal to said fine signal.

GEORGE B. LITCHFORD.

REFERENCES CITED

The following references are of record in the file of this patent:

UNITED STATES PATENTS

| Number | Name | Date |
| --- | --- | --- |
| 2,253,958 | Luck | Aug. 26, 1941 |
| 2,313,048 | Byrne | Mar. 9, 1943 |
| 2,404,196 | Seeley | July 16, 1946 |
| 2,422,110 | Luck | June 10, 1947 |
| 2,454,766 | Brillouin | Nov. 30, 1948 |
| 2,499,894 | Wallace | Mar. 7, 1950 |